United States Patent
Johnson

(10) Patent No.: US 12,451,545 B2
(45) Date of Patent: Oct. 21, 2025

(54) HALOGEN-BASED THERMO-ELECTROCHEMICAL CONVERTER

(71) Applicant: JTEC ENERGY, INC., Atlanta, GA (US)

(72) Inventor: David Ketema Johnson, Douglasville, GA (US)

(73) Assignee: JTEC ENERGY, INC., Atlanta, GA (US)

( * ) Notice: Subject to any disclaimer, the term of this patent is extended or adjusted under 35 U.S.C. 154(b) by 527 days.

(21) Appl. No.: 17/926,701

(22) PCT Filed: May 21, 2021

(86) PCT No.: PCT/US2021/033537
§ 371 (c)(1),
(2) Date: Nov. 21, 2022

(87) PCT Pub. No.: WO2021/237013
PCT Pub. Date: Nov. 25, 2021

(65) Prior Publication Data
US 2023/0207928 A1    Jun. 29, 2023

Related U.S. Application Data

(60) Provisional application No. 63/028,125, filed on May 21, 2020.

(51) Int. Cl.
*H01M 14/00* (2006.01)
(52) U.S. Cl.
CPC .................... *H01M 14/00* (2013.01)
(58) Field of Classification Search
None
See application file for complete search history.

(56) References Cited

U.S. PATENT DOCUMENTS

| 7,160,639 B2* | 1/2007 | Johnson | H01M 14/00 429/465 |
| 2010/0139274 A1* | 6/2010 | Zyhowski | F01K 25/06 570/135 |

(Continued)

FOREIGN PATENT DOCUMENTS

| CN | 1421053 A | 5/2003 |
| CN | 105257425 A | 1/2016 |

(Continued)

OTHER PUBLICATIONS

Office Action issued Apr. 15, 2025 in KR Application No. 10-2022-7044776 (with English Translation).

(Continued)

*Primary Examiner* — Scott J. Chmielecki
(74) *Attorney, Agent, or Firm* — Panitch Schwarze Belisario & Nadel LLP

(57) ABSTRACT

A method of generating electrical energy using an electrochemical direct heat to electricity converter operating on the Rankine cycle is provided. The converter includes a working fluid, a high temperature electrochemical cell including a first membrane electrode assembly, a low temperature electrochemical cell including a second membrane electrode assembly, an evaporator coupled to the first electrochemical cell, a condenser coupled to the second electrochemical cell, and an external load. The method involves introducing the working fluid at the first membrane electrode assembly as a liquid, expanding the working fluid through the first membrane electrode assembly and evaporating it into a vapor, and cooling and condensing the vapor back into a liquid at the second membrane electrode assembly.

8 Claims, 3 Drawing Sheets

(56) References Cited

U.S. PATENT DOCUMENTS

| | | | | |
|---|---|---|---|---|
| 2011/0277747 A1* | 11/2011 | Vollhardt | ............ | H01M 14/005 |
| | | | | 126/643 |
| 2012/0122017 A1* | 5/2012 | Mills | ........................ | G21B 3/00 |
| | | | | 429/218.2 |
| 2019/0161870 A1* | 5/2019 | Wang | ....................... | C25B 15/02 |
| 2025/0118810 A1* | 4/2025 | Rao | ................... | H01M 50/4295 |

FOREIGN PATENT DOCUMENTS

| | | |
|---|---|---|
| CN | 107743571 A | 2/2018 |
| EP | 2014880 A1 | 1/2009 |
| KR | 101744878 B1 | 6/2017 |
| WO | 2015095555 A1 | 6/2015 |

OTHER PUBLICATIONS

International Search Report and Written Opinion issued Aug. 20, 2021 in International Application No. PCT/US2021/033537.
International Preliminary Report on Patentability issued Dec. 1, 2022 in International Application No. PCT/US2021/033537.
Notification of Allowance issued Dec. 12, 2024 in CN Application No. 202180049742.1 (with English Summary).

* cited by examiner

HALOGEN-BASED THERMO-ELECTROCHEMICAL CONVERTER

CROSS-REFERENCE TO RELATED APPLICATION

This application is a Section 371 of International Application No. PCT/US2021/033537, filed May 21, 2021, which was published on Nov. 25, 2021 under International Publication No. WO2021/237013 A1, which claims priority to U.S. Provisional Application No. 63/028,125, filed on May 21, 2020, the entire contents of all of which are incorporated herein by reference.

BACKGROUND OF THE INVENTION

The conversion of heat energy or chemical energy to electrical energy, or vice-versa, may be accomplished in a variety of ways. For example, known electrochemical cells or batteries rely on chemical reactions wherein ions and electrons of a reactant being oxidized are transferred to the reactant being reduced via separate paths. Specifically, the electrons are transferred electrically via wiring through an external load where they perform work and the ions are conducted through an electrolyte separator.

However, battery type electrochemical cells can produce only a limited amount of energy because the confines of the battery casing limit the amount of available reactants that may be contained therein. Although such cells can be designed to be recharged by applying a reverse polarity current/voltage across the electrodes, such recharging requires a separate electrical source. Also, during the recharging process, the cell is typically not usable.

Fuel cells have been developed in an effort to overcome such problems associated with battery type electrochemical cells. In conventional fuel cells, the chemical reactants are continuously supplied to the electrochemical cell and reaction products are continuously removed. In a manner similar to batteries, fuel cells operate by conducting an ionized species through a selective electrolyte which generally blocks passage of electrons and non-ionized species, such that the electrons have to pass externally through an electrical load to complete the reaction.

The most common type of fuel cell is a proton exchange membrane (PEM) hydrogen-oxygen fuel cell which passes hydrogen through one of the electrodes and oxygen through the other electrode. The hydrogen ions are conducted through a proton conductive electrolyte separator or PEM to the oxygen side of the cell under the voltage potential of the hydrogen-oxygen chemical reaction. Porous electrodes on either side of the electrolyte separator or PEM are used to couple the electrons involved in the chemical reaction through an external load via an external circuit. The electrons and hydrogen ions reconstitute hydrogen in a reaction with oxygen on the oxygen side of the cell for the production of water which is expelled from the system. A continuous electrical current is maintained by a continuous supply of hydrogen and oxygen to the cell.

Mechanical heat engines have also been designed and used to produce electrical power. Mechanical heat engines operate on thermodynamic cycles wherein shaft work is performed using a piston or turbine to compress a working fluid. The compression process is performed at a low temperature and, after compression, the working fluid is raised to a higher temperature. At the high temperature, the working fluid is allowed to expand against a load, such as a piston or turbine, thereby producing shaft work. A key to the operation of all engines employing a working fluid is that less work is required to compress the working fluid at low temperatures than that produced by expanding it at high temperatures. This is the case for all thermodynamic engines employing a working fluid.

For example, steam engines operate on the Rankine thermodynamic cycle, wherein water is pumped to a high pressure, and then heated to steam and expanded through a piston or turbine to perform work. Internal combustion engines operate on the Otto cycle, wherein low-temperature ambient air is compressed by a piston and then heated to very high temperatures via fuel combustion inside the cylinder. As the cycle continues, the expansion of the heated air against the piston produces more work than that consumed during the lower temperature compression part of the cycle.

The Stirling engine has been developed to operate on the Stirling cycle in an effort to provide an engine that has high efficiency and offers greater versatility in the selection of the heat source. The ideal Stirling thermodynamic cycle is of equivalent efficiency to the ideal Carnot cycle, which defines the theoretical maximum efficiency of an engine operating on heat input at high temperatures and heat rejection at low temperatures. However, as with all mechanical engines, the Stirling engine suffers from reliability problems and efficiency losses associated with its mechanical moving parts.

In an effort to avoid the problems inherent with mechanical heat engines, Alkali Metal Thermo-Electrochemical Conversion (AMTEC) cells have been designed as a thermo-electrochemical heat engine. AMTEC heat engines utilize pressure to generate a voltage potential and electrical current by forcing an ionizable working fluid, such as sodium, through an electrochemical cell at high temperatures. The electrodes couple the electrical current to an external load. Electrical work is performed as the pressure differential across the electrolyte separator forces molten sodium atoms through the electrolyte. The sodium is ionized upon entering the electrolyte, thereby releasing electrons to the external circuit. On the other side of the electrolyte, the sodium ions recombine with the electrons to reconstitute sodium upon leaving the electrolyte, in much the same way as the process that occurs in battery and fuel cell type electrochemical cells. The reconstituted sodium, which is at a low pressure and a high temperature, leaves the electrochemical cell as an expanded gas. The gas is then cooled and condensed back to a liquid state. The resulting low-temperature liquid is then re-pressurized. Operation of an AMTEC engine approximates the Rankine thermodynamic cycle.

Numerous publications are available on AMTEC technology. See, for example, *Conceptual design of AMTEC demonstrative system for* 100 *t/d garbage disposal power generating facility*, Qiuya Ni et al. (Chinese Academy of Sciences, Inst. of Electrical Engineering, Beijing, China). Another representative publication is *Intersociety Energy Conversion Engineering Conference and Exhibit* (IECEC), 35th, Las Vegas, NV (Jul. 24-28, 2000), Collection of Technical Papers. Vol. 2 (A00-37701 10-44). Also see American Institute of Aeronautics and Astronautics, 190, p. 1295-1299. REPORT NUMBER(S)-AIAA Paper 2000-3032.

The heat rejected during cooling and re-condensation of the high temperature expanded gas leaving the electrode at low pressure represents a significant source of entropy loss and therefore AMTEC heat engine inefficiency. AMTEC engines also suffer from reliability issues due to the highly corrosive nature of the alkali metal working fluid. They also have very limited utility. Specifically, AMTEC engines can only be operated at very high temperatures because ionic conductive solid electrolytes achieve practical conductivity levels only at high temperatures. Indeed, even the low-temperature pressurization process must occur at a relatively high temperature, because the alkali metal working fluid must remain above its melt temperature at all times as it moves through the cycle. Mechanical pumps, wicks and even magneto-hydrodynamic pumps have been used to pressurize the low-temperature working fluid.

In an effort to overcome the above-described drawbacks of conventional mechanical and thermo-electrochemical heat engines, the Johnson Thermo-Electrochemical Converter (JTEC) system was developed, as disclosed in U.S. Pat. No. 7,160,639 filed Apr. 28, 2003, International Patent Application No. PCT/US2015/044435 filed Aug. 10, 2015, and International Patent Application No. PCT/US2016/21508 filed Mar. 9, 2016, the entire contents of all three documents being incorporated herein by reference.

A more recent development of the JTEC relates to an electrochemical direct JTEC having membrane electrode assemblies and a control circuit which operate to maintain a constant prescribed pressure ratio within the converter. More particularly, extra hydrogen is pumped to the high pressure side of the converter, and the additional pumped hydrogen compensates for the normal pressure loss due to molecular hydrogen diffusion through the membranes of the membrane electrode assembly stacks. Diffusion of molecular hydrogen through the separator membrane represents a significant decrease in power density over time, because the diffusion reduces the pressure differential across the electrodes of the membrane electrode assemblies and thereby reduces output voltage. Diffusion of molecular hydrogen also causes a reduction in efficiency, since this diffusion from high pressure to low pressure occurs without the diffusing hydrogen molecules undergoing an electrochemical reaction to produce electrical power. The membrane electrode assemblies and control circuit therefore operate to maintain a constant prescribed pressure ratio within the converter.

A common challenge for the JTEC is the need for large membrane electrode assembly surface areas, because high levels of current are required to complement the small voltage levels available per each membrane electrode assembly, if useful levels of power are to be achieved. As a result, conventional JTEC systems can be difficult to manufacture. The need therefore remains for a JTEC that provides higher voltage (potential) per membrane electrode assembly pair.

Fossil fuels still play a dominant role in energy resources as the energy demands keep rising. Research in such is of great demand, in particular, regarding the use of low grade waste heat to minimize energy losses which will reduce fuel consumption and ultimately achieve higher conversion efficiencies. For that, optimizations of well-known systems could offer a pathway for power generation. It is well understood that among the technologies available today such as organic Rankine cycle, Kalina cycle, and Supercritical cycle, the organic Rankine Cycle is the only one that can produce 15-50% more power output for the same heat and is mainly suited for low-temperature heat recovery to generate power with low maintenance. See D. Huijuan Chen, Yogi Goswami, Elias K. Stefanakos, "A review of thermodynamic cycles and working fluids for the conversion of low-grade heat", *Renew Sustain Energy Rev.*, vol. 14, pp. 3059-3067 (2010).

Indeed, the Rankine cycle is widely known to recycle various low-grade heat energies such as solar energy, biomass energy and geothermal heat where the performance is routinely related to the detailed working fluid properties. However, some researchers have postulated that the working fluid has little to do with the efficiency of the cycle which leads to a pathway for hybrid systems. See A. Perna, M. Minutillo, E. Jannelli, "Investigations on an advanced power system based on a high temperature polymer electrolyte membrane fuel cell and an organic Rankine cycle for heating and power production", *Energy*, vol. 88, pp. 874-884 (2015). However, hybrid systems involving fuel cells and the Rankine cycle have yet to materialize into a fundamental technology. In fact, phosphoric acid-based fuel cells are widely considered to be the most commercialized due to their high durability, structure and wider temperature operating range as compared to Nafion-based fuel cells, even though they suffer from low power density and high manufacturing cost. See H. Ito, "Economic and environmental assessment of phosphoric acid fuel cell-based combined heat and power system for an apartment complex", *Int'l Hydrogen Energy*, vol. 42, pp. 15449-15463 (2017); and S. Wang, S. P. Jiang, "Prospects of fuel cell technologies", *National Science Review*, vol. 4, pp. 163-166 (2017). When combined with the Rankine cycle, these performances have only been evaluated using the first law of thermodynamics which suggests limits for practical operation and design. See "Doosan fuel cell to verify using ORC with PAFC", *Fuel Cell Bulletin*, p. 1 (2019). The converter of the present invention eludes such issues.

BRIEF DESCRIPTION OF THE SEVERAL VIEWS OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown. In the drawings.

DETAILED DESCRIPTION OF THE INVENTION

Figure 1:
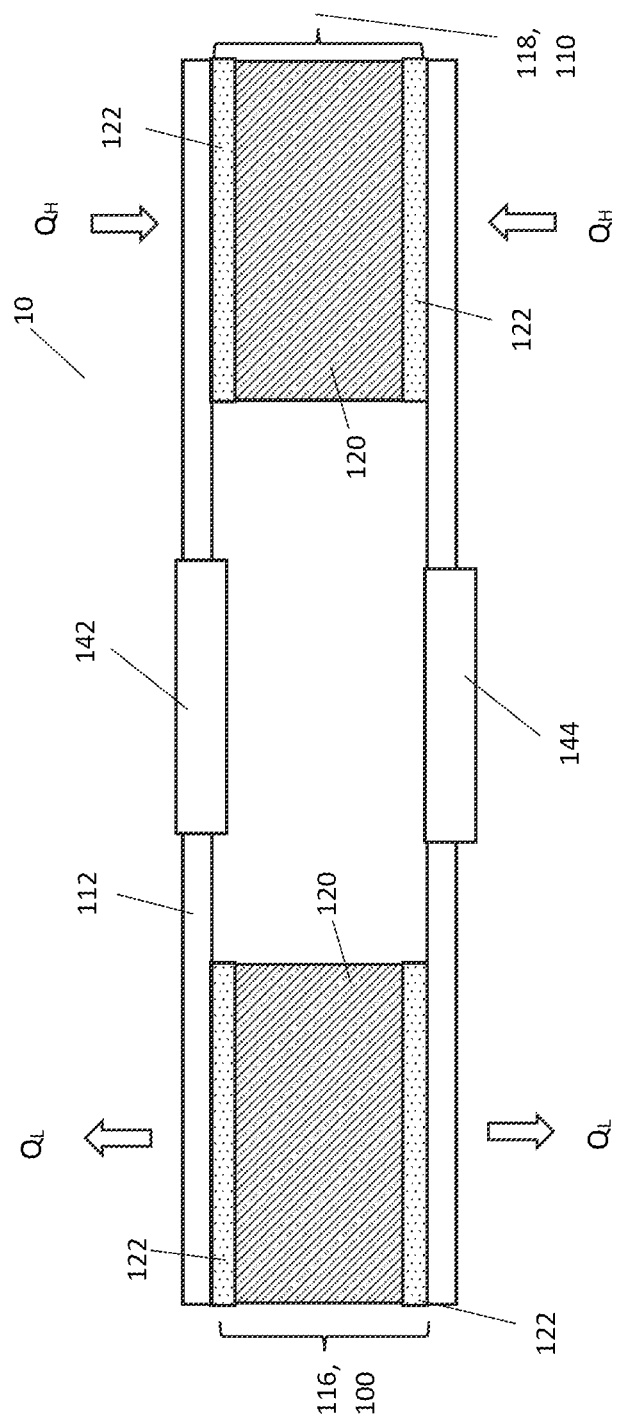
FIG. 1 is a diagram of a thermo-electrochemical converter according to an embodiment of the present invention.

Certain terminology is used in the following description for convenience only and is not limiting. The words "proximal," "distal," "upward," "downward," "bottom" and "top" designate directions in the drawings to which reference is made. The words "inwardly" and "outwardly" refer to directions toward and away from, respectively, a geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

It will also be understood that terms such as "first," "second," and the like are provided only for purposes of clarity. The elements or components identified by these terms, and the operations thereof, may easily be switched. Also, MEA cell array and MEA cell stack may be used interchangeably.

Referring to FIG. 1, there is shown an electrochemical direct heat to electricity converter 10 in accordance with an embodiment of the present invention. The electrochemical direct heat to electricity converter 10 comprises a first electrochemical cell 100 operating at a first temperature, a second electrochemical cell 110 operating at a second temperature which is higher than the first temperature, a conduit system 112 that couples the first electrochemical cell 100 with the second electrochemical cell 110, and a supply of working fluid contained within and travelling through the conduit system 112. Each electrochemical cell 100, 110 includes one or more membrane electrode assemblies. In one embodiment, the converter 10 further includes a heat exchanger (not shown) that couples the low temperature electrochemical cell 100 and the high temperature electrochemical cell 110 together.

In one embodiment, the working fluid is selected from the group consisting of a halogen and sulfur. For example, in one embodiment, the working fluid is preferably a halogen, such as bromine or iodide. In another embodiment, the working fluid is preferably sulfur.

More particularly, referring to FIG. 1, the first electrochemical cell 100 includes a first membrane electrode assembly (MEA) 116 coupled to a low temperature heat sink $Q_L$ (i.e., a cold source). As such, the first MEA 116 is a low temperature MEA and the first electrochemical cell 100 represents a low temperature side of the converter 10. The second electrochemical cell 110 includes a second MEA 118 coupled to a high temperature heat source $Q_H$. As such, the second MEA 118 is a high temperature MEA and the second electrochemical cell 110 represents a high temperature side of the converter 10. During operation, cooling is supplied to the first MEA 116 and heat is supplied to the second MEA 118.

Figure 2:
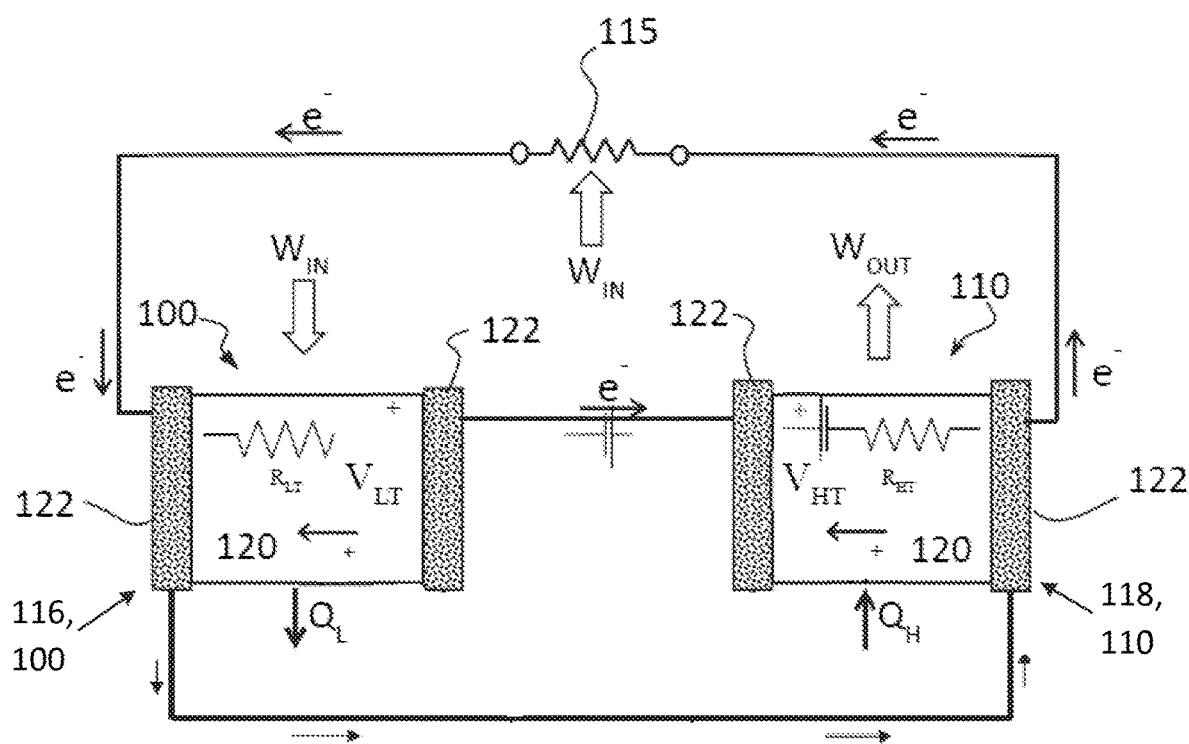
FIG. 2 is a schematic of the operating configuration of the thermo-electrochemical converter shown in FIG. 1.

On both the low temperature side 100 and high temperature side 110 of the converter, there may be present arrays or stacks of MEAs 116, 118. The MEAs 116, 118 may be connected, for example, in series to achieve higher overall output voltage, or in parallel to achieve higher overall output current. In one embodiment, the first and second MEAs 116, 118 are arranged electrically in series with an external load 115, as shown in FIG. 2. Further, the first and second MEAs 116, 118 are preferably plumbed in series within a closed loop.

Each MEA 116, 118 includes a non-porous membrane 120 capable of conducting ions of the working fluid and porous electrodes 122 capable of conducting electrons positioned on opposite sides of the non-porous membrane 120.

The membranes 120 are preferably ion conductive membranes or proton conductive membranes. The membranes 120 preferably have a thickness on the order of approximately 0.1 μm to 500 μm, and more preferably between approximately 1 μm and 500 μm. More particularly, the membranes 120 are preferably made from a proton conductive material, and more preferably a polymer proton conductive material or a ceramic proton conductive material. The membranes 120 of the MEAs 116, 118 are not necessarily made of the same material. The material selected for a given MEA 116, 118 will depend on its intended operating temperature. In one embodiment, the membranes 120 are preferably formed of a material comprising a compound represented by the general formula $Na_xAl_yTi^{3+}_{x-y}Ti^{4+}_{8-x}O_{16}$, as disclosed in U.S. Pat. No. 4,927,793 of Hori et al., which is incorporated herein by reference, since this material exhibits high proton conductivity over a broad temperature range. However, it will be understood by those skilled in the art that any material, and preferably any polymer or ceramic material, which demonstrates a suitable proton conductivity over a desired temperature range may be used to form the membranes 120. For example, in an alternate embodiment, the membranes 120 are formed of hydronium beta" alumina.

The electrodes 122 of each MEA 116, 118 are preferably thin electrodes having a thickness on the order of approximately 0.1 μm to 1 cm, and more preferably approximately 10 μm. The use of different materials for the various components of each MEA 116, 118 (i.e., the electrodes 122 and the membranes 120) could result in very high thermal stresses due to differences in the thermal expansion coefficients between the materials. Accordingly, the electrodes 122 of an MEA 116, 118 are preferably comprised or formed of the same material as the membranes 120. However, the electrodes 122 are preferably porous structures, while the membranes 120 are preferably non-porous structures. Also, it will be understood that the electrodes 122 and the membranes 120 may be formed of different materials having similar thermal expansion coefficients.

In one embodiment, the porous electrodes 122 may be doped or infused with additional material(s) to provide electronic conductivity and catalytic material, in order to promote oxidation and reduction of the working fluid.

In one embodiment, each MEA is formed as follows. A solid electrolyte material that is capable of conducting ions of the working fluid, preferably bromine, is formed into a disc. The ionically conductive disc is impermeable to gases and liquids. Each side of the solid electrolyte disc is coated with an electrode material and current collector designed to facilitate electrochemical reactions at the surface of the solid electrolyte disc, thereby creating a MEA 116, 118.

Figure 3:
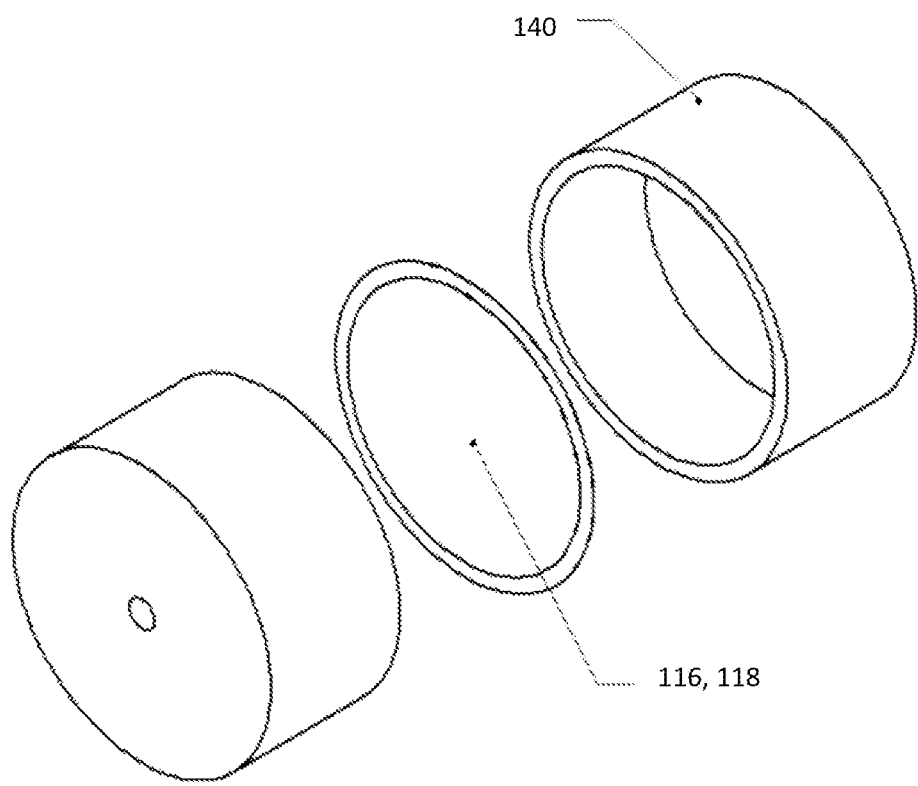
FIG. 3 is an exploded view of a membrane electrode assembly and housing of the thermo-electrochemical converter shown in FIG. 1.

Referring to FIG. 3, each MEA 116, 118 is preferably positioned within a housing 140, as shown in FIG. 3. Each housing 140 is preferably comprised of glass or another material, such as a metal (e.g., stainless steel), provided with an interior glass lining layer. However, it will be understood by those skilled in the art that other materials which are known or discovered to be stable when in contact with a halogen or sulfur may be utilized to form the housing 140.

The converter 10 preferably further comprises an evaporator 142 and a condenser 144. More particularly, the high temperature side, which corresponds to the high temperature MEA 118, of the converter 10 includes or is coupled to an evaporator 142, while the low temperature side, which corresponds to the low temperature MEA 116, includes or is coupled to a condenser 144.

The converter 10 of the present invention operates on a vapor phase cycle where the working fluid is evaporated and condensed. More particularly, the converter 10 operates on the Rankine cycle. It has been well accepted in the technical field that only a limited number of fluids have the combination of chemical, environmental, thermodynamic, and safety properties required for their viable utilization in the Rankine cycle. See, e.g., McLinden et al., Nat. Commun., 8 (2017), Article 14476. This is because while some working fluids present excellent thermodynamic performance in cooling cycles, their environmental or safety characteristics hinder their use, forcing the utilization of other fluids with lower performance for power generation cycles. Bromine, in particular, has generally never been considered for utilization in the Rankine cycle, since it has a high ozone depletion potential. It has now been discovered, however, that in the converter of the present invention, the risk related to the high ozone depletion potential of bromine is negligible because the converter operates as a closed system.

During operation, one side of the converter 10 is completely flooded with the working fluid as a liquid, while the other side of the converter 10 is only partially flooded with the working fluid as a liquid. At the high temperature MEA 118, the liquid-phase working fluid is initially at a high-temperature, high-pressure state. Electrical power is generated as the working fluid expands across the high temperature MEA 118 from the high-temperature, high-pressure state to a high-temperature, low-pressure state. Heat $Q_H$ is supplied to the thin film membrane 120 to achieve a near constant temperature expansion process. At the high temperature side of the converter 10, the liquid-phase working fluid is also evaporated into the vapor phase by the evaporator 142. The working fluid is then pumped or otherwise transported as a vapor to the low temperature MEA 116. At the low temperature MEA 116, electrical energy is supplied to pump the vapor-phase working fluid from the low-temperature, low-pressure state to a low-temperature, high-pressure state. The temperature of the working fluid is cooled by removing heat $Q_L$ from the proton conductive membranes 120 during the compression process. At the low temperature side of the converter 10, the vapor-phase working fluid is condensed back to a liquid, and more particularly a high-pressure liquid, by the condenser 144. The high-pressure liquid-phase working fluid is pumped back to the high-temperature MEA 118 as the cycle continues. The converter 10 of the present invention is therefore a closed loop engine and converts thermal energy into electrical energy using the Rankine cycle.

Because pumping a liquid requires very little work as compared to compressing a gas, the back-work ratio for a Rankine cycle is considered favorable, as it permits higher overall device voltages. Also, because of the relatively low boiling point of the working fluid, the device voltage can be higher even at waste heat temperatures (i.e., between 100° C. to 200° C.).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An electrochemical direct heat to electricity converter comprising:
   a working fluid, the working fluid being selected from the group consisting of a halogen and sulfur;
   a heat source and a heat sink, the heat source being at an elevated temperature above a temperature of the heat sink;
   a first electrochemical cell comprising a first membrane electrode assembly across which the working fluid is configured to flow, the first membrane electrode assembly including a first porous electrode, a second porous electrode and at least one ion conductive membrane sandwiched between the first and second porous electrodes, the first electrochemical cell being coupled to the heat source;
   a second electrochemical cell comprising a second membrane electrode assembly across which the working fluid is configured to flow, the second membrane electrode assembly including a first porous electrode, a second porous electrode and at least one ion conductive membrane sandwiched between the first and second porous electrodes, the second electrochemical cell being coupled to the heat sink;
   an evaporator coupled to the first electrochemical cell;
   a condenser coupled to the second electrochemical cell; and
   an external load, the first and second electrochemical cells being connected in series with the external load,
     wherein the working fluid is introduced at the first membrane electrode assembly as a liquid and expands through the first membrane electrode assembly, such that the first membrane electrode assembly generates a voltage, and is evaporated into a vapor phase, and
     wherein the working fluid is introduced at the second membrane electrode assembly in the vapor phase and is cooled and condensed back to the liquid phase.

2. The electrochemical direct heat to electricity converter of claim 1, wherein the working fluid is one of bromine and iodide.

3. The electrochemical direct heat to electricity converter of claim 2, wherein the working fluid is bromine.

4. The electrochemical direct heat to electricity converter of claim 1, wherein the converter is configured to operate in the Rankine cycle.

5. The electrochemical direct heat to electricity converter of claim 1, wherein each of the first and second membrane electrode assemblies is positioned within a housing comprising glass.

6. A method of generating electrical energy using an electrochemical direct heat to electricity converter,
   the converter comprising:
     a working fluid, the working fluid being selected from the group consisting of a halogen and sulfur;
     a heat source and a heat sink, the heat source being at an elevated temperature above a temperature of the heat sink;
     a first electrochemical cell comprising a first membrane electrode assembly across which the working fluid is configured to flow, the first membrane electrode assembly including a first porous electrode, a second porous electrode and at least one ion conductive membrane sandwiched between the first and second porous electrodes, the first electrochemical cell being coupled to the heat source;
     a second electrochemical cell comprising a second membrane electrode assembly across which the working fluid is configured to flow, the second membrane electrode assembly including a first porous electrode, a second porous electrode and at least one ion conductive membrane sandwiched between the first and second porous electrodes, the second electrochemical cell being coupled to the heat sink;
     an evaporator coupled to the first electrochemical cell;
     a condenser coupled to the second electrochemical cell; and
     an external load, the first and second electrochemical cells being connected in series with the external load,
   the method comprising operating the converter on the Rankine cycle by:
     completely flooded one side of the converter with the working fluid as a liquid and partially flooding another side of the converter with the working fluid as a liquid,
     introducing the working fluid at the first membrane electrode assembly as a liquid, the liquid expands through the first membrane electrode assembly, such that the first membrane electrode assembly generates a voltage, and being evaporated into a vapor phase by the evaporator, and introducing the working fluid at the second membrane electrode assembly as a vapor, and cooling and condensing the vapor back to the liquid phase.

7. The method of claim 6, wherein the working fluid is one of bromine and iodide.

8. The method of claim 7, wherein the working fluid is bromine.

* * * * *